US012665665B2

(12) United States Patent
Jiang

(10) Patent No.: US 12,665,665 B2
(45) Date of Patent: Jun. 23, 2026

(54) METHOD AND SYSTEM FOR INSPECTING A FIBERED OPTICAL PATH

(71) Applicant: HUAWEI TECHNOLOGIES CO., LTD., Shenzhen (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 18/362,161

(22) Filed: Jul. 31, 2023

(65) Prior Publication Data

US 2025/0047378 A1     Feb. 6, 2025

(51) Int. Cl.
*H04B 10/071* (2013.01)
*H04B 10/50* (2013.01)

(52) U.S. Cl.
CPC ......... *H04B 10/071* (2013.01); *H04B 10/503* (2013.01)

(58) Field of Classification Search
CPC ............................ H04B 10/071; H04B 10/503
See application file for complete search history.

(56) References Cited

U.S. PATENT DOCUMENTS

| | | | | |
|---|---|---|---|---|
| 2006/0028636 A1* | 2/2006 | Payton | ............... | G01M 11/3172 356/73.1 |
| 2006/0028637 A1* | 2/2006 | Payton | ............... | G01M 11/3172 356/73.1 |
| 2006/0066839 A1* | 3/2006 | Payton | ............... | G01L 1/242 356/73.1 |
| 2007/0171400 A1* | 7/2007 | Payton | ............... | G01M 11/3172 356/73.1 |
| 2011/0228255 A1* | 9/2011 | Li | ............... | G01B 11/18 356/32 |
| 2012/0176606 A1* | 7/2012 | Zadorozhny | ........ | G01M 5/0066 356/73.1 |
| 2013/0188176 A1* | 7/2013 | Lovely | ............... | G01D 5/353 356/73.1 |
| 2013/0188177 A1* | 7/2013 | Lovely | ............... | G01M 11/33 356/73.1 |
| 2015/0040681 A1* | 2/2015 | Sarchi | ............... | G01M 5/0025 73/847 |
| 2022/0390321 A1* | 12/2022 | Leclerc | ............... | H04B 10/071 |

* cited by examiner

*Primary Examiner* — Jonathan M Hansen
(74) *Attorney, Agent, or Firm* — BCF LLP

(57) ABSTRACT

A method and system for inspecting polarization in a fibered optical path. The method being executed by a computer-implemented system comprising a controller and at least one detector communicatively coupled to the controller, the computer-implemented system being operatively connected to the fibered optical path, including: causing a laser to emit at least one optical pulse into the fibered optical path; detecting a plurality of reflected optical signals from the fibered optical path; determining a plurality of experimental correlation values based on the plurality of reflected optical signals and a reference signal function; and in response to a given experimental correlation value of the plurality of experimental correlation values being less than a threshold, identifying a mechanical disturbance caused by birefringence in the fibered optical path, the mechanical disturbance being located at a location of the plurality of locations corresponding to the given experimental correlation value.

11 Claims, 8 Drawing Sheets

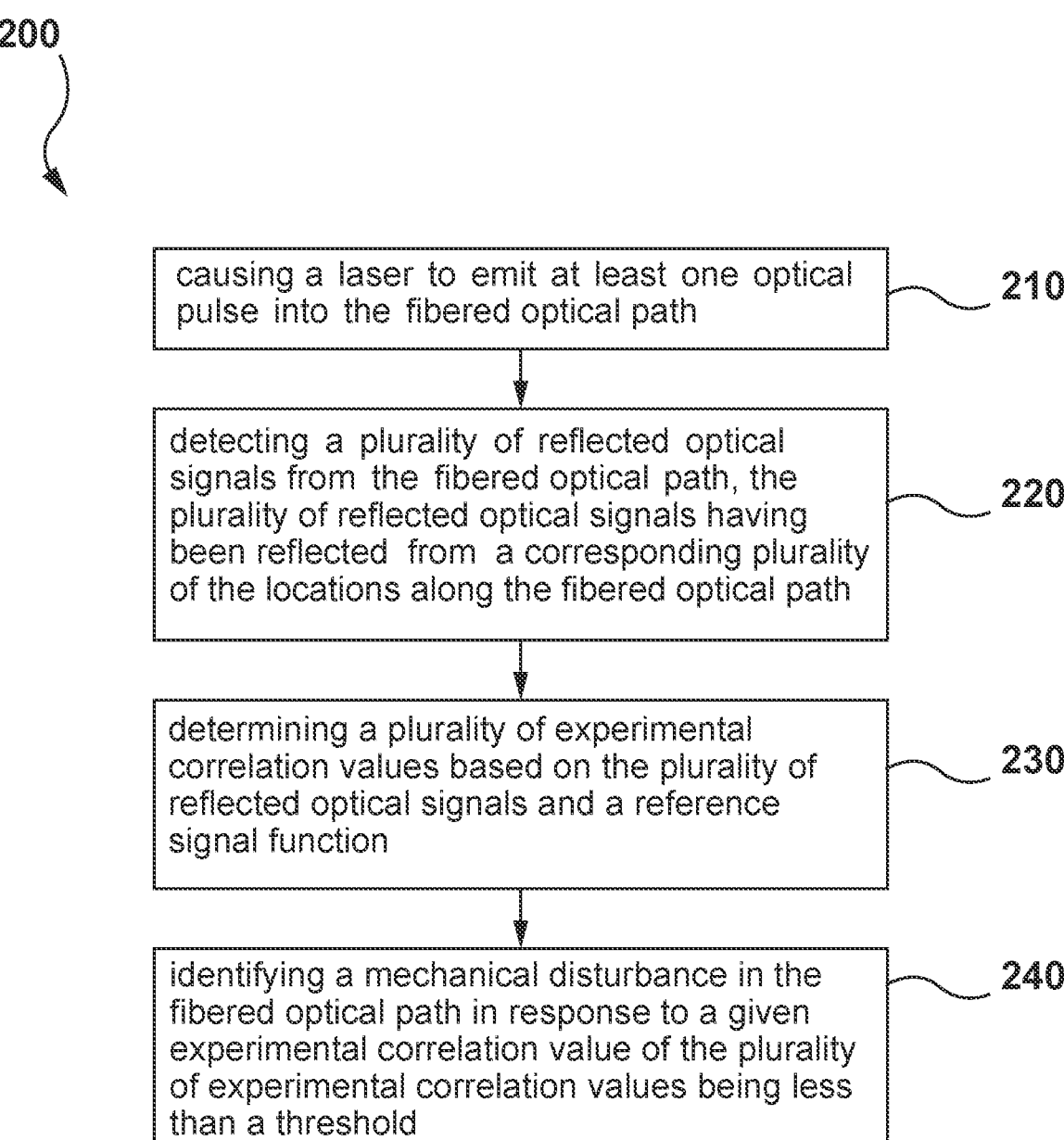

200 causing a laser to emit at least one optical pulse into the fibered optical path — 210 detecting a plurality of reflected optical signals from the fibered optical path, the plurality of reflected optical signals having been reflected from a corresponding plurality of the locations along the fibered optical path — 220 determining a plurality of experimental correlation values based on the plurality of reflected optical signals and a reference signal function — 230 identifying a mechanical disturbance in the fibered optical path in response to a given experimental correlation value of the plurality of experimental correlation values being less than a threshold — 240

FIG. 7

METHOD AND SYSTEM FOR INSPECTING A FIBERED OPTICAL PATH

CROSS-REFERENCE TO RELATED APPLICATIONS

This is the first application filed for the instantly disclosed technology.

TECHNICAL FIELD

The present disclosure generally relates to optical communications and, in particular, to methods for inspecting a fibered optical path.

BACKGROUND

Optical time domain reflectometry (OTDR) is an inspection method widely used to detect discrete reflections and Rayleigh backscattering in an optical fiber or fibered optical path. Inspection by OTDR is broadly performed as follows: laser pulses are sent into fiber under test, with return light intensity (or loss) of back reflected light being detected as a function of elapsed time, also known as time of flight (TOF). Since the return light is usually very low in intensity, an average over many pulses is often used to improve the dynamic range or signal to noise ratio (SNR).

OTDR systems and methods can detect various events: such as loss of fiber connector, fiber bend, splice, fiber cut. However, conventional OTDR measures the total return light and thus are not sensitive to events causing changes to light phase or polarization. Mechanical disturbances of fiber, including acoustic vibrations for example, induce phase or polarization change in return light and therefore would not be detectable in conventional OTDR.

Polarization sensitive OTDR methods are available, but generally suffer from low signal-to-noise ratios (SNRs). While conventional OTDR can average over many measurements to improve SNR, polarization sensitive OTDR is based on differential measurements and cannot be averaged over multiple signals. There is thus a limit to the distance of fiber that is inspectable by polarization sensitive OTDR methods, after which any signal is masked by noise due to signal strength drop-off over distance.

To this end, there is an interest in developing systems and methods for detecting mechanical disturbance and/or state of polarization changes in a fibered optical path.

SUMMARY

The embodiments of the present disclosure have been developed based on developers' appreciation of the limitations associated with the prior art. Developers of the present technology have devised methods and systems for inspecting an optical fiber or fibered optical path in order to efficiently detect change in polarization (i.e. birefringence) along the fiber, especially where caused by a mechanical disturbance. The method is broadly based on determining a change in correlation between a reference signal (which may be averaged over many signals) and a single test signal (single pulse). The reference signal and the one (or more) test signal are measured or simulated for one chosen polarization state (either orthogonal state can be chosen). In contrast to standard polarization-OTDR, no additional measurement of the opposite polarization is required. While the noise is random, the correlation for a test signal and a corresponding reference should remain the same where there is no change of polarization between light in the test and reference. If the test signal experiences a change in polarization, the correlation between the test and the reference signal will be lower than expected at the corresponding distance. A change in state of polarization is detectable even in cases where the signal is well below the minimum noise level, thus greatly increasing the distance over which a mechanical disturbance can be detected.

In accordance with a first broad aspect of the present disclosure, there is provided a method for inspecting polarization in a fibered optical path, the method being executed by a computer-implemented system comprising a controller and at least one detector communicatively coupled to the controller, the computer-implemented system being operatively connected to the fibered optical path, the method comprising: causing a laser to emit at least one optical pulse into the fibered optical path; detecting a plurality of reflected optical signals from the fibered optical path, the plurality of reflected optical signals having been reflected from a corresponding plurality of locations along the fibered optical path; determining a plurality of experimental correlation values based on the plurality of reflected optical signals and a reference signal function, the plurality of reflected optical signals and the reference signal function being of a same polarization; and in response to a given experimental correlation value of the plurality of experimental correlation values being less than a threshold, identifying a mechanical disturbance caused by birefringence in the fibered optical path, the mechanical disturbance being located at a location of the plurality of locations corresponding to the given experimental correlation value.

In some embodiments, the method further includes, prior to determining the plurality of experimental correlation values, determining the reference signal function.

In some embodiments, determining the reference signal function comprises determining an average signal function with the fibered optical path being in an unperturbed state.

In some embodiments, determining the average signal value comprises causing the laser to emit a plurality of control optical pulses into the fibered optical path; for each pulse of the plurality of control optical pulses, detecting a plurality of control reflected optical signals from the fibered optical path; and calculating the average signal value function averaging the plurality of control reflected optical signals over the plurality of control optical pulses.

In some embodiments, the method further includes determining a reference correlation function for the fibered optical path being in an unperturbed state; and determining a difference between the plurality of experimental correlation values and the reference correlation function, the given experimental correlation value being below the threshold when the difference between the plurality of experimental correlation values and the reference correlation function is greater than a predetermined deviation value.

In some embodiments, determining the reference correlation function comprises calculating a theoretical correlation function C, the correlation at a given location $z_k$ being determined by:

$$C(z_k) \approx \frac{\sum_{i=0}^{N} \exp(-4\alpha(z_k + i\Delta z))}{\sqrt{\sum_{i=0}^{N} \exp(-4\alpha(z_k + i\Delta z))} \sqrt{\sum_{i=0}^{N} \exp(-4\alpha(z_k + i\Delta z)) + \sqrt{N} P_n}}$$

3 where $\alpha$ is a fiber loss coefficient of the fibered optical path, $P_n$ is a normalized noise power level, and N is a number of steps over a correlation window length.

In some embodiments, determining the plurality of experimental correlation values comprising calculating an experimental correlation value Ci, the correlation at a given location $z_k$ being determined by:

$$C_i(z_k) \approx \frac{\langle S(z_k:z_k + L)R_i(z_k:z_k + L)\rangle}{\sqrt{\langle S(z_k:z_k + L)^2 \rangle \langle R_i(z_k:z_k + L)^2 \rangle}}$$

where L is a correlation window length, $R_i(z_k:z_k+L)$ is the plurality of reflected optical signals over the correlation window length, $S(z_k:z_k+L)$ is the reference signal function over the correlation window length, and $\langle f \rangle$ is the expectation operation over a function $f$.

In some embodiments, the given experimental correlation value being less than the threshold is caused by a change in state of polarization induced by the mechanical disturbance.

In accordance with another broad aspect of the present disclosure, there is provided a method detecting a change of state of polarization in signals reflected in a fibered optical path, the method being executed by a computer-implemented system comprising a controller and at least one detector communicatively coupled to the controller, the computer-implemented system being operatively connected to the fibered optical path, the method comprising: causing a laser to emit at least one optical pulse into the fibered optical path; detecting a plurality of reflected optical signals from the fibered optical path, the plurality of reflected optical signals having been reflected from a corresponding plurality of locations along the fibered optical path; determining a plurality of experimental correlation values based on the plurality of reflected optical signals and a reference signal function; and in response to a given experimental correlation value of the plurality of experimental correlation values being less than a threshold, identifying a point of polarization change in the fibered optical path at a location of plurality of locations corresponding to the given experimental correlation value.

In accordance with yet another broad aspect of the present disclosure, there is provided a system for inspecting in a fibered optical path, comprising a controller; a laser communicatively coupled to the controller, the laser being configured for operatively coupling to the fibered optical path; and at least one detector communicatively coupled to the controller, the at least one detector being configured to receive signals from the fibered optical path; the controller being configured to: cause the laser to emit at least one optical pulse into the fibered optical path; detect a plurality of reflected optical signals from the fibered optical path, the plurality of reflected optical signals having been reflected from a corresponding plurality of locations along the fibered optical path; determine a plurality of experimental correlation values based on the plurality of reflected optical signals and a reference signal function; and in response to a given experimental correlation value of the plurality of experimental correlation values being less than a threshold, identify a mechanical disturbance caused by birefringence in the fibered optical path, the mechanical disturbance being located at a location of the plurality of locations corresponding to the given experimental correlation value.

4

BRIEF DESCRIPTION OF THE FIGURES

Further features and advantages of the present disclosure will become apparent from the following detailed description, taken in combination with the appended drawings, in which:

FIG. 7 depicts a flowchart of a method for inspecting in a fibered optical path, in accordance with various non-limiting embodiments of the present disclosure.

Figure 1:
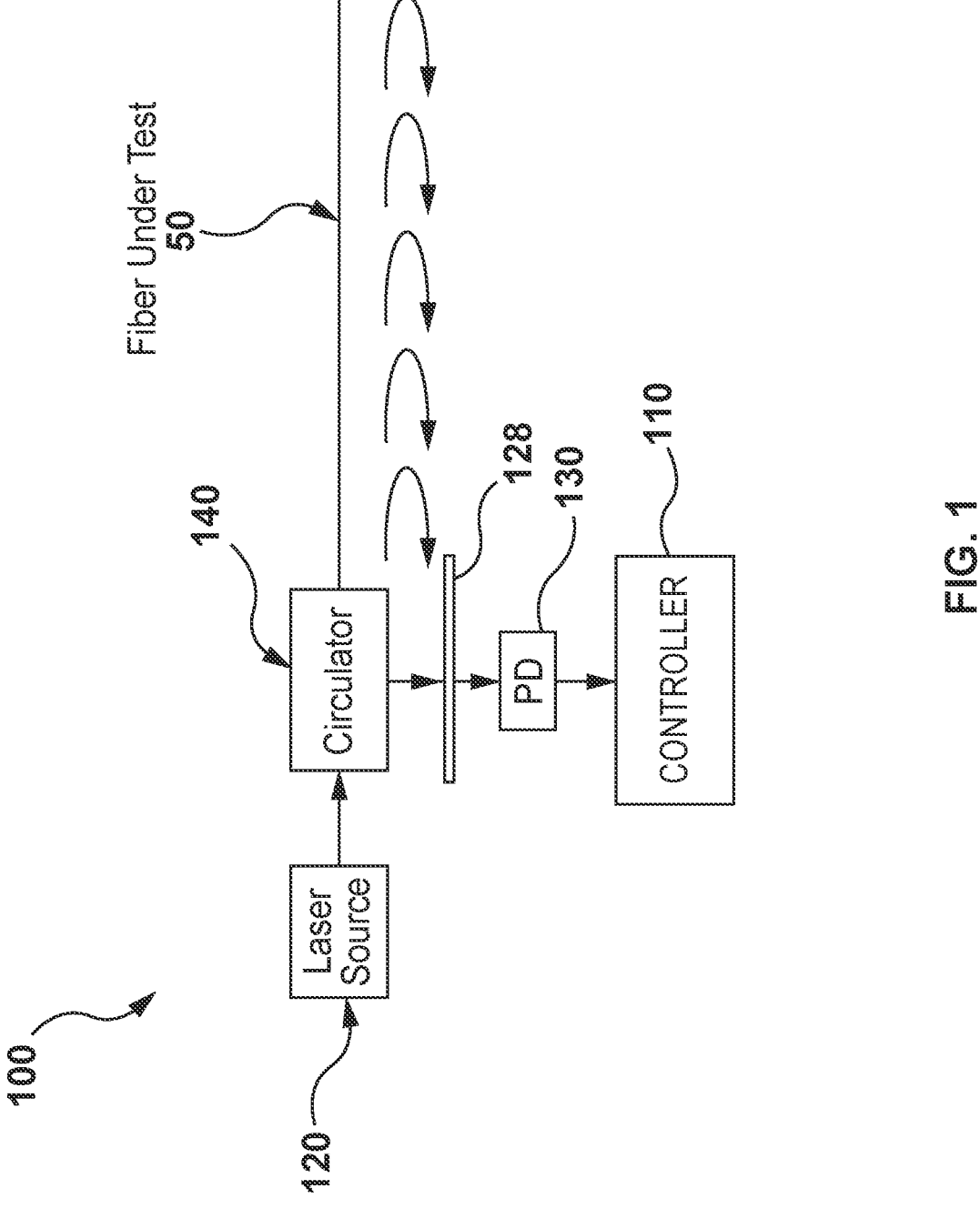
FIG. 1 is a schematic block diagram of one non-limiting embodiment of a system according to the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for inspecting an optical fiber or fibered optical path for polarization changes and/or mechanical disturbances.

As used herein, the term "about" or "approximately" refers to a +/−10% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described embodiments appertain to. The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of the present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for characterizing a fibered optical path.

FIG. 1 illustrates a system 100 for inspecting a fibered optical path 50, also referred to herein as the fiber under test 50, according to a non-limiting embodiment of the present technology. As shown, the system 100 is computer-implemented, including a controller 110. One non-limiting embodiment of the controller 110 is described in more detail below. The system 100 includes a laser source 120, also referred to herein as the laser 120, and a detector 130, each operatively connected to the controller 110 and the fiber under test 50. The system 100 also includes a polarizer 128, operatively disposed between the fiber under test 50 and the detector 130. The system 100 further generally includes an optical circulator 140 and additional optical components as would be known to a person of skill in the art. In the present embodiment, the detector 130 is specifically a photodetector (PD) 130.

During operation of the system 100, the laser source 120 generates one or more optical pulses which propagate toward and through the circulator 140. Details of how and when optical pulses are generated will be described in more detail below. At least a portion of the optical pulses are reflected (Rayleigh scattered) back from different locations, or distances, along the fiber 50 under test. The circulator 140 then receives the Rayleigh scattered portion of the one or more optical pulses, also referred to as reflected signals. The circulator 140 then directs the reflected signals through the polarizer 128 to the PD 130. The PD 130 converts the reflected signals (of the selected polarization) to corresponding electrical signals which in turn are communicated to the controller 110, which includes a signal processor (not separately shown). The controller 110 determines a strength (power) of the reflected signals as a function of time in order to determine their distance traveled in the optical fiber 50.

According to the present technology, the controller 110 is specifically configured to control the system components in order to inspect the fibered optical path 50 for detecting a change in polarization/mechanical disturbance thereof. The systems and methods described herein detect a change in birefringence (evidenced by a change in state of polarization, or SOP, of back scattered light), in order to detect or identify a location along the fiber 50 caused by a physical disturbance of the fiber 50, such as by vibrations. Broadly, the present systems and methods use determining a correlation of a test signal and a reference signal. The test correlation function is then compared to a known (reference) correlation function for signals from a fiber with no mechanical disturbance/polarization modification (i.e. a control case correlation function). Specific method steps according to non-limiting embodiments of the present technology are set out further below.

Figure 2:
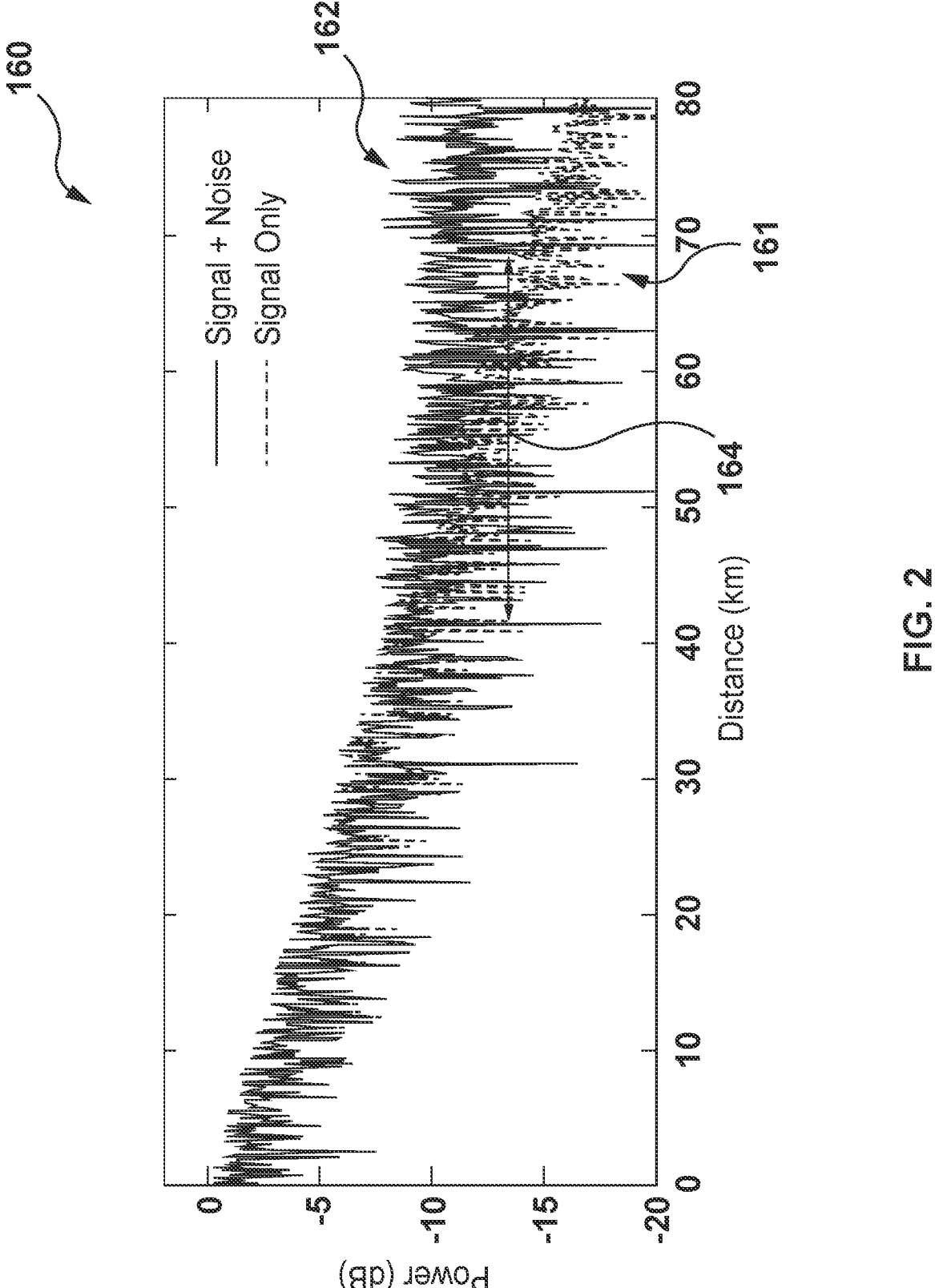
FIG. 2 illustrates an example measurement of signal and noise of back scattered signals over distance in a fibered optical path of the system of FIG. 1.
Figure 3:
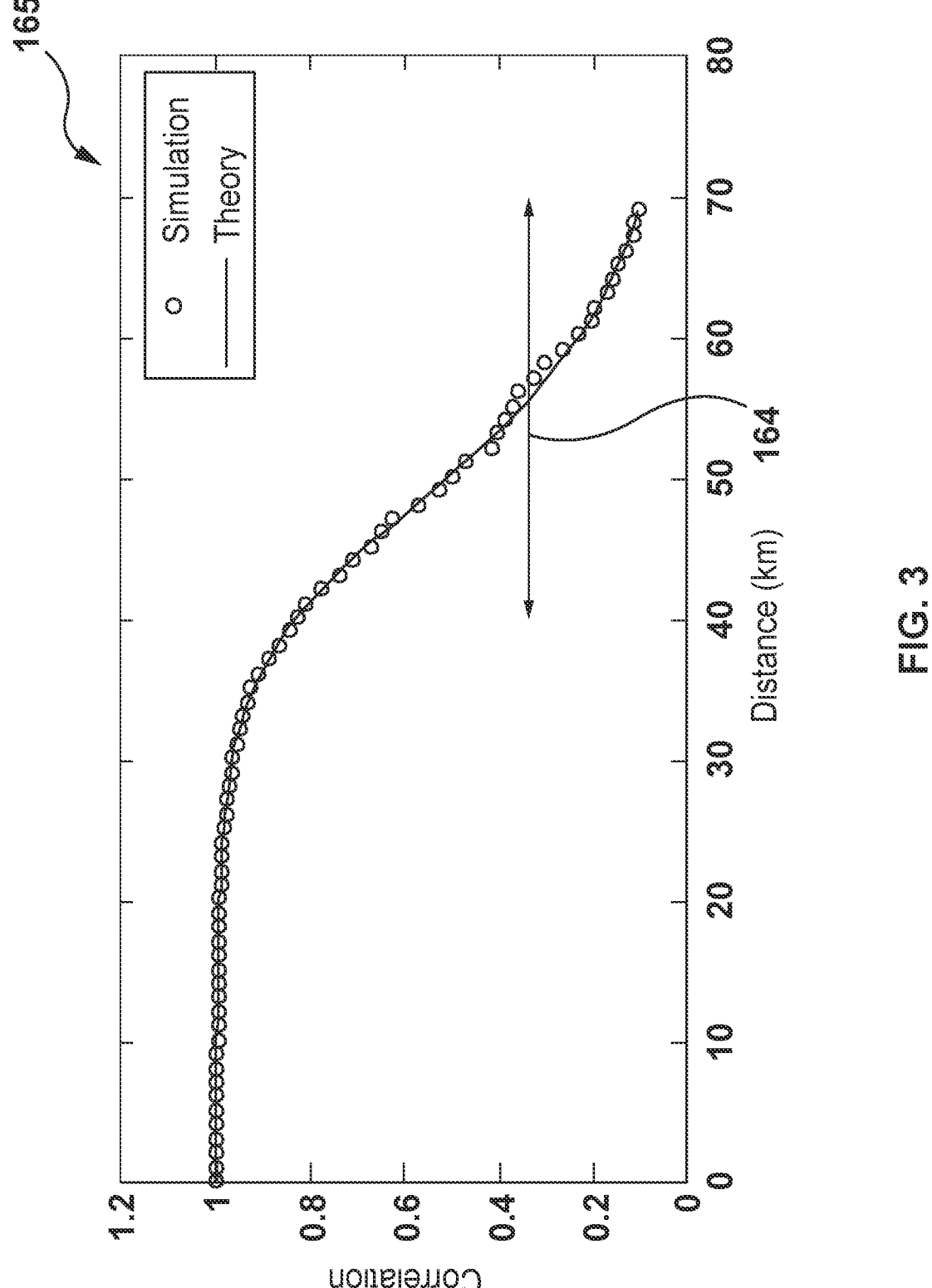
FIG. 3 illustrates an example simulated and theoretical correlation function over distance in the fibered optical path.

With reference to FIG. 2, a comparison between signal strength 161 (power in dB) alone and a combined signal and noise 162, as would be encountered in polarization OTDR for example, is illustrated. It is noted that the particular values of the signal and noise illustrated in FIG. 2 is just one non-limiting example. Beyond a distance of about 40 kilometers along the optical fiber 50, the signal 161 falls below the noise floor. After this distance, standard signal measurement schemes that cannot use signal averaging, such a polarization-OTDR, generally no longer provide reliable detection. As is illustrated in FIG. 3, a graph 165 illustrates a correlation measurement (simulated and theoretical) for a single-shot test signal to a known reference signal, over the same distance as FIG. 2. As can be seen from the range extension window 164 identified in FIGS. 2 and 3, a single-shot correlation measurement provides a non-zero correlation value even beyond the distance at which the signal falls below the noise floor. The single-shot signal to reference correlation is generally usable up to about 70 kilometers in the illustrated example, extending the distance over which a polarization change could be detected by about 30 kilometers (40 km to 70 km). It is noted that the particular range over which the present technology may add detection capability could vary, depending on specifics of the given embodiment. The measurement distances over which the mechanical disturbance could be detected according to the present technology could be greater or less than the illustrated example. It is also contemplated that the span over which the detection zone is increased could be greater or less than the presently illustrated example.

Figure 4:
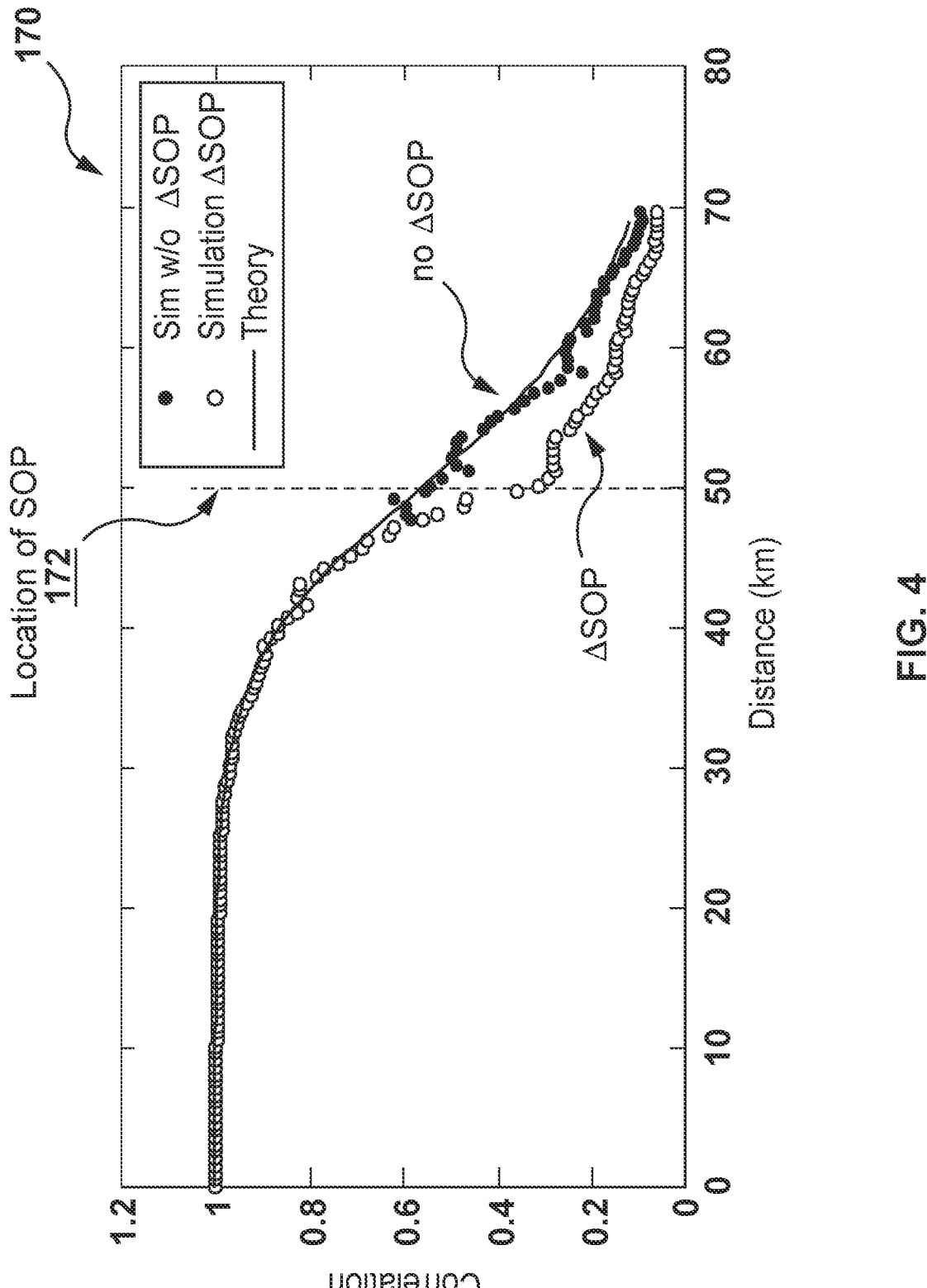
FIG. 4 is an example comparison between a simulated correlation with a test signal with no change in state of polarization (no $\Delta$SOP) and a test signal with a change in state of polarization ($\Delta$SOP)
Figure 5:
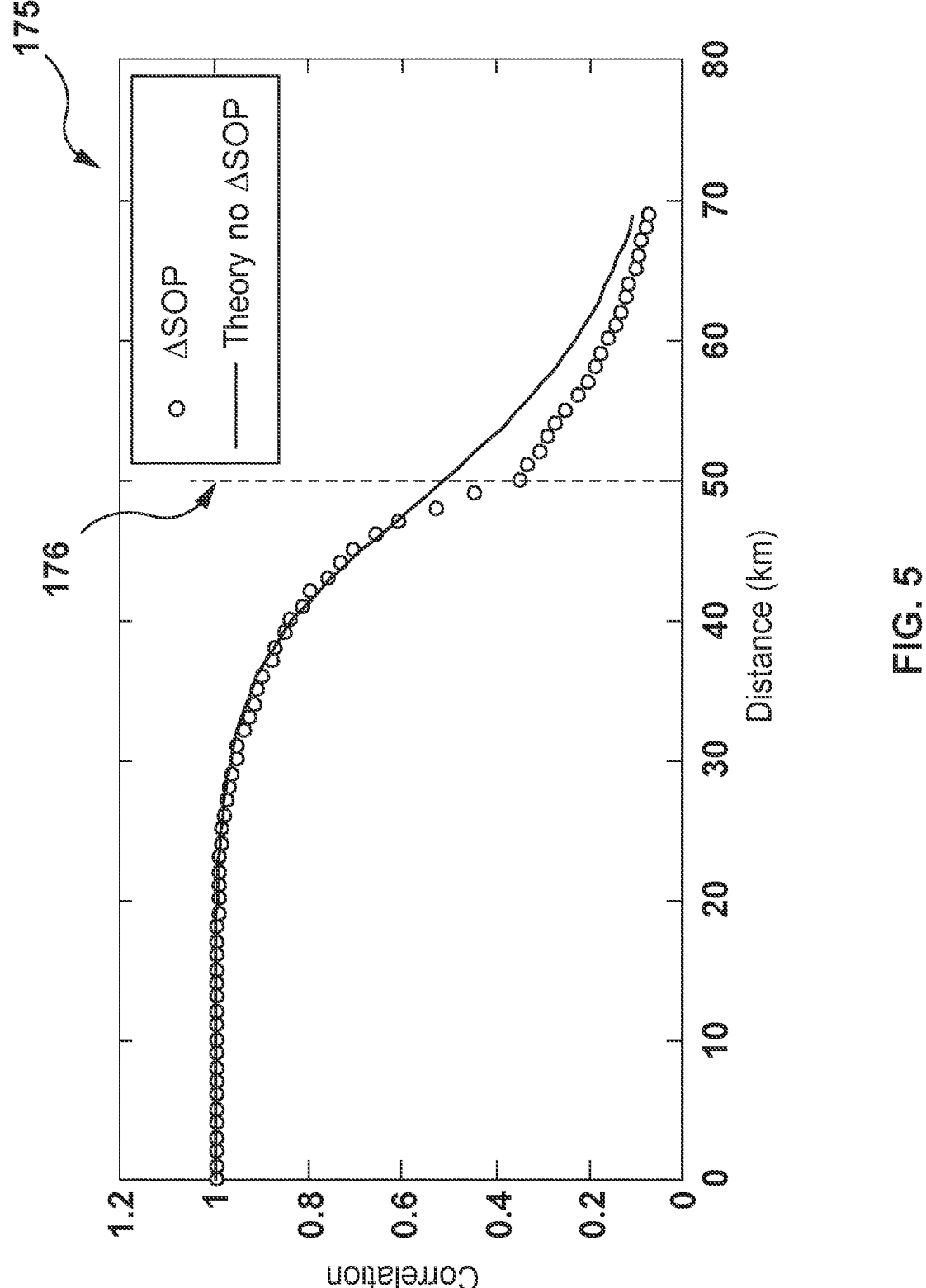
FIG. 5 is a simulated correlation of a test signal with a change in polarization at a distance of approximately 50 km along the fibered optical path of the system of FIG. 1.
Figure 6:
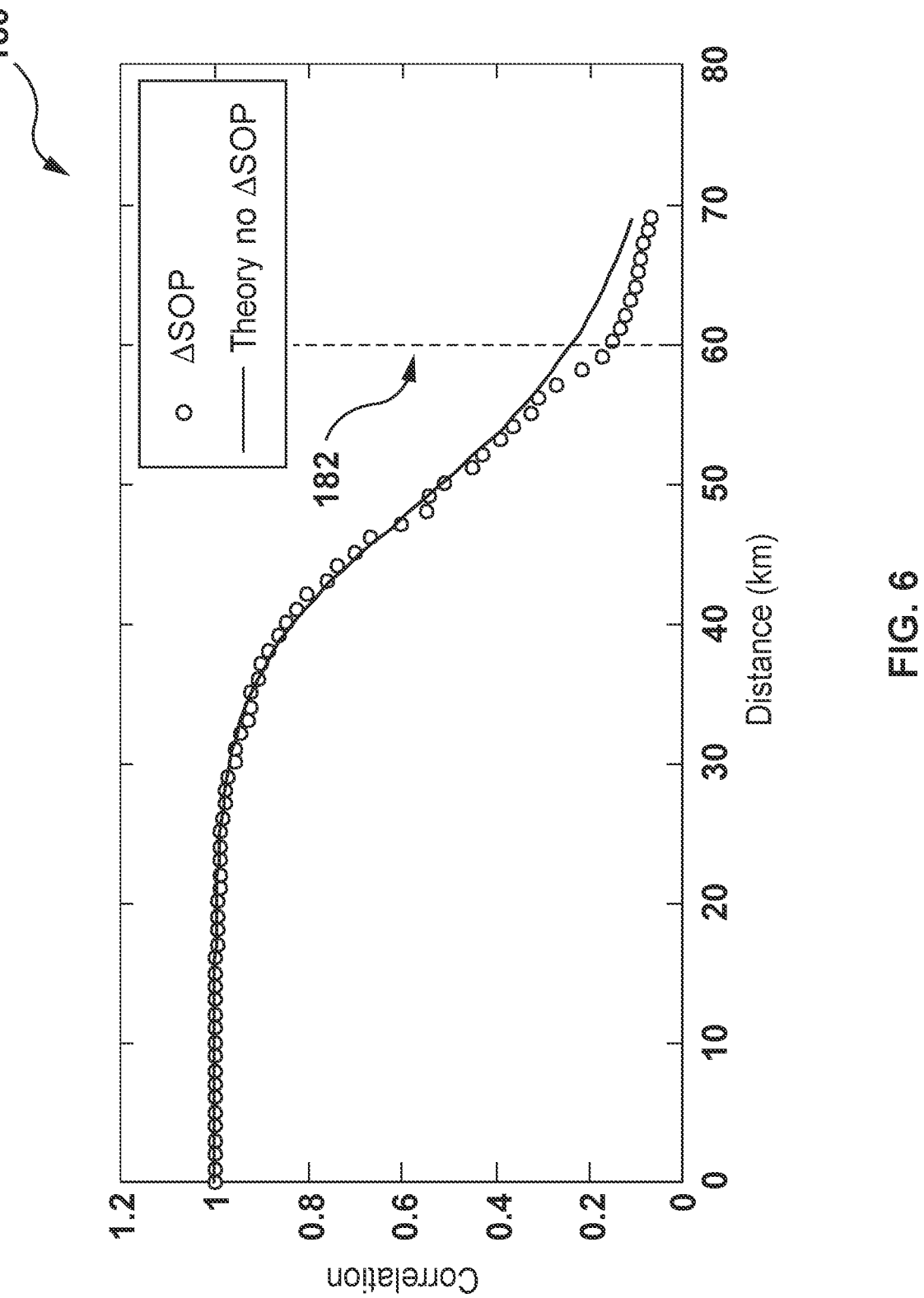
FIG. 6 is a simulated correlation of a test signal with a change in polarization at a distance of approximately 60 km along the fibered optical path of the system of FIG. 1.

As is further illustrated in FIG. 4, a graph 170 of signals having undergone a change in polarization have a reduced correlation with the known reference, compared to a single-shot signal of a maintained state of polarization. Specifically, the graph 170 illustrates a simulation between a test signal having undergone no change in polarization (no ΔSOP) as compared to the reference signal and a test signal that has undergone a change in polarization (ΔSOP), at a position 172 of approximately 50 km along the fiber 50. FIGS. 5 and 6 further illustrate the use of the correlation test for detecting a change in polarization in the range beyond the noise floor of about 40 km. In FIG. 5, a graph 175 illustrates a simulated signal for a mechanical disturbance at about 50 km (176). In FIG. 6, a graph 180 illustrates a simulated signal for a mechanical disturbance at about 60 km (182). When compared to the theoretical correlation for signals not undergoing a change in polarization/mechanical disturbance, the polarization modification can thus be detected when the measured correlation falls below the theoretical correlation (the correlation function for unchanged signals thus acting as a threshold).

With reference to FIG. 7, a method 200 for inspecting the fibered optical path 50 in accordance with various non-limiting embodiments of the present disclosure is illustrated in flowchart form.

The method 200 begins, at step 210, with causing the laser 120 to emit at least one optical pulse into the fibered optical path 50. As is noted above, a small portion of the optical pulse is back reflected/scattered (Rayleigh scattered) from many points along the fiber 50.

The method 200 continues, at step 220, with detecting a plurality of reflected optical signals from the fibered optical path 50, the back reflected optical signals having been reflected (Rayleigh scattered) back from a corresponding plurality of locations along the fibered optical path 50. The reflected signals are detected using the PD 130, with the circulator 140 having directed the signals back from the fiber 50 via the polarizer 128 to the PD 130.

The method 200 then continues, at step 230, with determining a plurality of experimental correlation values based on the plurality of reflected optical signals and a reference signal function. The plurality of reflected optical signals and the reference signal function to be compared by correlation of a same polarization. In the present system, the polarizer 128 to the PD 130 permits only detection of signals of the selected polarization. It is contemplated that the PD 130 could include a polarizing film, for example, in some embodiments. The plurality of experimental correlation values corresponding to an experimental correlation values along different distances along the fiber 50, such that a function of experimental correlation to distance can be determined, similar to the simulations illustrated in FIGS. 5 and 6.

In at least some embodiments, the method 200 could include determining the reference signal function (reference signal over distance), prior to determining the experimental correlation values. In some cases, the reference signal function could be determined before step 210, before taking any experimental measurements. In some other cases, the reference signal function could be determined after the experimental signal measurements have been taken.

In at least some embodiments of the method 200, determining the reference signal function includes determining an average signal function with the fibered optical path 50 being in an unperturbed state. Similar to standard OTDR methods, it is contemplated that the reference signal function could be determined by averaging over many reflected signals, as long as the fibered optical path 50 is known to be in an unperturbed state, i.e. where there is no mechanical perturbation nor induced birefringence to alter the polarization while averaging over the many signals.

In some embodiments, for example, determining an average signal value to use as the reference signal includes causing the laser 120 to emit a plurality of control optical pulses into the fibered optical path 50. For each pulse thereof, a plurality of control reflected optical signals from the fibered optical path 50 are received by the PD 130 and the controller 110. The method 200 could then further include calculating the average signal value function by averaging the plurality of control reflected optical signals over the plurality of control optical pulses.

In response to a given one or more of the plurality of experimental correlation values being less than a threshold, the method 200 then continues, at step 240, identifying a mechanical disturbance in the fibered optical path 50, the mechanical disturbance being located at a location of the plurality of locations corresponding to the given experimental correlation value. In the present embodiment, the threshold is established by a reference correlation value, representing the correlation value for signals known to be unperturbed correlated to the reference signal function. Thus, an experimental correlation value being less than the reference correlation value indicates that the test signal has undergone polarization change. In some embodiments, the given experimental correlation value could be determined to be below the threshold when the difference between the plurality of experimental correlation values and the reference correlation function is greater than a predetermined deviation value. As is generally noted here, the given experimental correlation value being less than the threshold of the present method embodiments is caused by a change in state of polarization induced by the mechanical disturbance. There are a wide variety of possible sources of mechanical disturbance contemplated, including but not limited to: digging near or adjacent to the fiber 50, earthquakes, animal interference (e.g. rodent biting the fiber 50), ocean currents, and human manipulation (including for example tapping the fiber 50).

In at least some embodiments, the method 200 could further include determining the reference correlation function for the fibered optical path 50 being in an unperturbed state. In such cases, the method 200 would then include determining a difference between the plurality of experimental correlation values and the reference correlation function.

In at least some embodiments, determining the reference correlation function includes calculating a theoretical correlation function C, the correlation at a given location $z_k$ being determined by:

$$C(z_k) \approx \frac{\left(\sum_{i=0}^{N} \exp(-4\alpha(z_k + i\Delta z))\right)}{\sqrt{\sum_{i=0}^{N} \exp(-4\alpha(z_k + i\Delta z))}\sqrt{\sum_{i=0}^{N} \exp(-4\alpha(z_k + i\Delta z))} + \sqrt{N} P_n} \quad (1)$$

where:
α is a fiber loss coefficient of the fibered optical path,
$P_n$ is a noise power level, normalized by the signal power level at an entrance of the fiber 50, and
N is a number of steps over a correlation window length.
In at least some embodiments, determining the plurality of experimental correlation values comprising calculating an experimental correlation value $C_i$, based on received signals R(z) and a deterministic signal S(z), i.e. the reference signal function. The received signals R(z) can be characterized as:

$$R_i(z) = S(z) + n, \quad (2)$$

where S(z) is the deterministic signal and n is random noise. The deterministic, reference signal function S(z), in at least some non-limiting embodiments, can be determined using a pulse average over K signals according to:

$$S(z) \approx \frac{1}{K} \sum_{i=1}^{K} R_i(z). \quad (3)$$

It is noted that the reference signal is determined for one chosen polarization state, specifically the state transmitted by the polarizer 128 for the experimental, received signals R(z), such that the same polarization is compared in the correlation for the received signals and the reference signal function.

Figure 8:
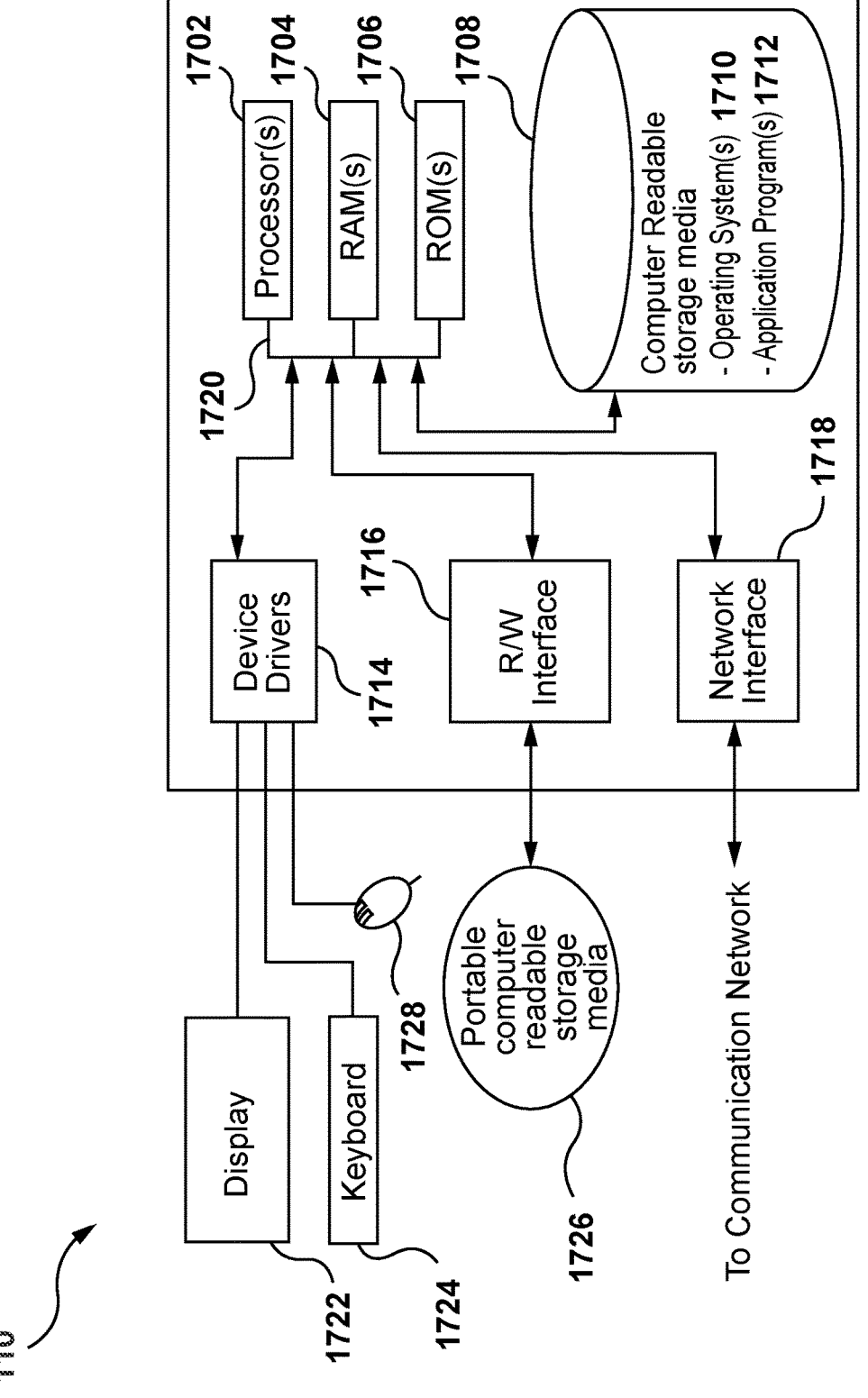
FIG. 8 depicts a high-level block diagram of components of the controller of the system of FIG. 1, in accordance with various embodiments of the present disclosure.

The correlation at a given location $z_k$ is then determined by:

$$C_i(z_k) \approx \frac{\langle S(z_k:z_k + L)R_i(z_k:z_k + L)\rangle}{\sqrt{\langle S(z_k:z_k + L)^2\rangle\langle R_i(z_k:z_k + L)^2\rangle}} \quad (4)$$

where:
L is a correlation window length,
$R_i(z_k:z_k+L)$ is the plurality of reflected optical signals over the correlation window length,
$S(z_k:z_k+L)$ is the reference signal function over the correlation window length, and
$\langle f \rangle$ is the expectation operation over a function $f$.
FIG. 8 depicts a high-level block diagram of components of one non-limiting example embodiment of the controller 110 in accordance with various embodiments of the present disclosure. It should be appreciated that FIG. 8 provides only an illustration of one implementation of the controller 110 and does not imply any limitations with regard to the environments in which different embodiments may be implemented. For instance, while the controller 110 provides signal processing operations, it is contemplated that some operations could be performed in separate hardware or software. Various modifications to the depicted environment may be done to implement the controller 110 without departing from the principles presented herein. The controller 110 may be a server, a desktop computer, a laptop computer, or any device that may be configured to implement the present technology, as should be understood by a person skilled in the art.

As shown, the controller 110 employs one or more different type of processors 1702, one or more computer-readable random access memories (RAMs) 1704, one or more computer-readable read only memories (ROMs) 1706, one or more computer-readable storage media 1708, device drivers 1714, a read/write (R/W) driver interface 1716, a network interface 1718, all interconnected over a communication fabric 1720. The communication fabric 1720 may be implemented by any architecture designed for communicating data and/or control information between processors (such as microprocessors, communications and network processors, etc.), system memory, peripheral devices, and any other hardware components within a system.

The processor 1702 of the controller 120 may include one or more of a CPU, an accelerator, a microprocessor, a GPU, an NPU, an ASIC, a FPGA, a dedicated logic circuitry, a dedicated artificial intelligence processor unit, or combinations thereof.

One or more operating systems 1710 and one or more application programs 1712 (examples of application programs may include programming instructions) are stored on one or more of computer-readable storage media 1708 for execution by one or more of the processors 1702 via one or more of respective RAMs 1704 (which typically include a cache memory). In the illustrated embodiment, each of the computer-readable storage media 1708 may be embodied as a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 1716 reads from and writes to one or more portable computer-readable storage media 1726. The application programs 1712 may be related to the intelligent heterogeneous computing system and stored on one or more of portable computer-readable storage media 1726, read via the respective R/W driver interface 1716 and loaded into the respective computer-readable storage media 1708.

Further, network interface 1718 may be based on a TCP/IP adapter card or wireless communication adapter (such as a wireless communication adapter using OFDMA technology). The application programs 1712 on the controller 120 may be downloaded to the controller 120 from an external computer or external storage device via a communication network (for example, the Internet, a local area network or other wide area network or wireless network) and network interface 1718. From network interface 1718, application programs 1712 may be loaded onto the computer-readable storage media 1708. The controller 120 may connect to routers, firewalls, switches, gateway computers and/or edge servers of the communication network using copper wires, optical fibers, wireless transmission, and the like.

The controller 120 may also include a display screen 1722, a keyboard or keypad 1724, and a computer mouse or touchpad 1728. The device drivers 1714 may interface with display screen 1722 for imaging, with the keyboard or the keypad 1724, with a computer mouse or touchpad 1728, and/or with display screen 1722 (which may be a touch sensitive display) for alphanumeric character entry and user selections. The device drivers 1714, R/W driver interface 1716 and network interface 1718 may comprise hardware and software (stored on the computer-readable storage media 1708 and/or the ROM 1706).

It is to be understood that the operations and functionality of the controller 120, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for inspecting polarization in a fibered optical path, the method being executed by a computer-implemented system comprising a controller and at least one detector communicatively coupled to the controller, the computer-implemented system being operatively connected to the fibered optical path, the method comprising:

causing a laser to emit at least one optical pulse into the fibered optical path;

detecting a plurality of reflected optical signals from the fibered optical path, the plurality of reflected optical signals having been reflected from a corresponding plurality of locations along the fibered optical path;

determining a plurality of experimental correlation values based on the plurality of reflected optical signals and a reference signal function, the plurality of reflected optical signals and the reference signal function being of a same polarization;

determining a reference correlation function for the fibered optical path being in an unperturbed state;

determining a difference between the plurality of experimental correlation values and the reference correlation function; and in response to a given experimental correlation value of the plurality of experimental correlation values being less than a threshold, identifying a mechanical disturbance caused by birefringence in the fibered optical path, the mechanical disturbance being located at a location of the plurality of locations corresponding to the given experimental correlation value, the given experimental correlation value being below the threshold when the difference between the plurality of experimental correlation values and the reference correlation function is greater than a predetermined deviation value, wherein determining the reference correlation function comprises calculating a theoretical correlation function C, the correlation at a given location $z_k$ being determined by:

$$C(z_k) \approx \frac{\sum_{i=0}^{N} \exp(-4\alpha(z_k + i\Delta z))}{\sqrt{\sum_{i=0}^{N} \exp(-4\alpha(z_k + i\Delta z))} \sqrt{\sum_{i=0}^{N} \exp(-4\alpha(z_k + i\Delta z)) + \sqrt{N} P_n}},$$

where:

$\alpha$ is a fiber loss coefficient of the fibered optical path, $P_n$ is a normalized noise power level, and N is a number of steps over a correlation window length.

2. The method of claim 1, further comprising, prior to determining the plurality of experimental correlation values, determining the reference signal function.

3. The method of claim 2, wherein determining the reference signal function comprises determining an average signal function with the fibered optical path being in an unperturbed state.

4. The method of claim 3, wherein determining the average signal value comprises:

causing the laser to emit a plurality of control optical pulses into the fibered optical path;

for each pulse of the plurality of control optical pulses, detecting a plurality of control reflected optical signals from the fibered optical path; and calculating the average signal value function averaging the plurality of control reflected optical signals over the plurality of control optical pulses.

5. A method for inspecting polarization in a fibered optical path, the method being executed by a computer-implemented system comprising a controller and at least one detector communicatively coupled to the controller, the computer-implemented system being operatively connected to the fibered optical path, the method comprising:

causing a laser to emit at least one optical pulse into the fibered optical path;

detecting a plurality of reflected optical signals from the fibered optical path, the plurality of reflected optical signals having been reflected from a corresponding plurality of locations along the fibered optical path;

determining a plurality of experimental correlation values based on the plurality of reflected optical signals and a reference signal function, the plurality of reflected optical signals and the reference signal function being of a same polarization;

determining a reference correlation function for the fibered optical path being in an unperturbed state;

determining a difference between the plurality of experimental correlation values and the reference correlation function; and in response to a given experimental correlation value of the plurality of experimental correlation values being less than a threshold, identifying a mechanical disturbance caused by birefringence in the fibered optical path, the mechanical disturbance being located at a location of the plurality of locations corresponding to the given experimental correlation value, the given experimental correlation value being below the threshold when the difference between the plurality of experimental correlation values and the reference correlation function is greater than a predetermined deviation value, wherein determining the plurality of experimental correlation values comprising calculating an experimental correlation value $C_i$, the correlation at a given location $z_k$ being determined by:

$$C_i(z_k) \approx \frac{\langle S(z_k{:}z_k + L)R_i(z_k{:}z_k + L)\rangle}{\sqrt{\langle S(z_k{:}z_k + L)^2\rangle\langle R_i(z_k{:}z_k + L)^2\rangle}},$$

where:

L is a correlation window length, $R_i(z_k{:}z_k{+}L)$ is the plurality of reflected optical signals over the correlation window length, $S(z_k{:}z_k{+}L)$ is the reference signal function over the correlation window length, and $\langle f\rangle$ is an expectation operation over a function f.

6. The method of claim 1, wherein the given experimental correlation value being less than the threshold is caused by a change in state of polarization induced by the mechanical disturbance.

7. A system for inspecting in a fibered optical path, the system comprising:

a controller;

a laser communicatively coupled to the controller, the laser being configured for operatively coupling to the fibered optical path; and at least one detector communicatively coupled to the controller, the at least one detector being configured to receive signals from the fibered optical path;

the controller being configured to:

cause the laser to emit at least one optical pulse into the fibered optical path;

detect a plurality of reflected optical signals from the fibered optical path, the plurality of reflected optical signals having been reflected from a corresponding plurality of locations along the fibered optical path;

determine a plurality of experimental correlation values based on the plurality of reflected optical signals and a reference signal function;

determine a reference correlation function for the fibered optical path being in an unperturbed state;

determining a difference between the plurality of experimental correlation values and the reference correlation function; and in response to a given experimental correlation value of the plurality of experimental correlation values being less than a threshold, identify a mechanical disturbance caused by birefringence in the fibered optical path, the mechanical disturbance being located at a location of the plurality of locations corresponding to the given experimental correlation value, the given experimental correlation value being below the threshold when the difference between the plurality of experimental correlation values and the reference correlation function is greater than a predetermined deviation value, the controller being further configured to determine the reference correlation function by calculating a theoretical correlation function C, the correlation at a given location $z_k$ being determined by:

$$C(z_k) \approx \frac{\sum_{i=0}^{N}\exp(-4\alpha(z_k + i\Delta z))}{\sqrt{\sum_{i=0}^{N}\exp(-4\alpha(z_k + i\Delta z))}\sqrt{\sum_{i=0}^{N}\exp(-4\alpha(z_k + i\Delta z)) + \sqrt{N}P_n}},$$

where:

$\alpha$ is a fiber loss coefficient of the fibered optical path, $P_n$ is a normalized noise power level, and N is a number of steps over a correlation window length.

8. The method of claim 5, further comprising, prior to determining the plurality of experimental correlation values, determining the reference signal function.

9. The method of claim 8, wherein determining the reference signal function comprises determining an average signal function with the fibered optical path being in an unperturbed state.

10. The method of claim 9, wherein determining the average signal value comprises:

causing the laser to emit a plurality of control optical pulses into the fibered optical path;

for each pulse of the plurality of control optical pulses, detecting a plurality of control reflected optical signals from the fibered optical path; and calculating the average signal value function averaging the plurality of control reflected optical signals over the plurality of control optical pulses.

11. The method of claim 5, wherein the given experimental correlation value being less than the threshold is caused by a change in state of polarization induced by the mechanical disturbance.

* * * * *